United States Patent [19]
Doodson

[11] Patent Number: 6,000,537
[45] Date of Patent: Dec. 14, 1999

[54] HOUSING WITH READABLE SIDE WALLS FOR A DISC-SHAPED INFORMATION CARRIER

[75] Inventor: Peter J. Doodson, Eindhoven, Netherlands

[73] Assignee: U.S. Philips Corporation, New York, N.Y.

[21] Appl. No.: 09/244,840

[22] Filed: Feb. 2, 1999

Related U.S. Application Data

[63] Continuation-in-part of application No. 09/030,493, Feb. 25, 1998, Pat. No. 5,890,590, and a continuation-in-part of application No. 09/078,821, May 14, 1998, abandoned.

[30] Foreign Application Priority Data

Jun. 10, 1997 [EP] European Pat. Off. .............. 97201747

[51] Int. Cl.⁶ .................................................. B65D 85/57
[52] U.S. Cl. ..................................... 206/232; 206/308.1
[58] Field of Search ............................... 206/232, 308.1, 206/309, 310, 311, 312, 459.5

[56] References Cited

U.S. PATENT DOCUMENTS

| | | | |
|---|---|---|---|
| 4,874,085 | 10/1989 | Grobecker et al. | 206/309 |
| 5,829,584 | 11/1998 | Raucci, Jr. | 206/308.1 |
| 5,833,068 | 11/1998 | Fantone | 206/308.1 X |
| 5,890,590 | 4/1999 | Doodson | 206/308.1 |

FOREIGN PATENT DOCUMENTS

3425579A1  1/1986  Germany .

*Primary Examiner*—Jacob K. Ackun
*Attorney, Agent, or Firm*—David R. Treacy

[57] ABSTRACT

A housing for holding a disc-shaped information carrier having a bottom section including a holding device, and a cover section which is hingeably connected to the bottom section. The bottom section is box-shaped and has transparent front, side and rear walls. The bottom section contains an insert sheet having portions which extend adjacent each of these transparent walls, including substantially the length of the side walls. Each of these portions may be provided with readable data relating to the information stored in the information carrier.

18 Claims, 4 Drawing Sheets

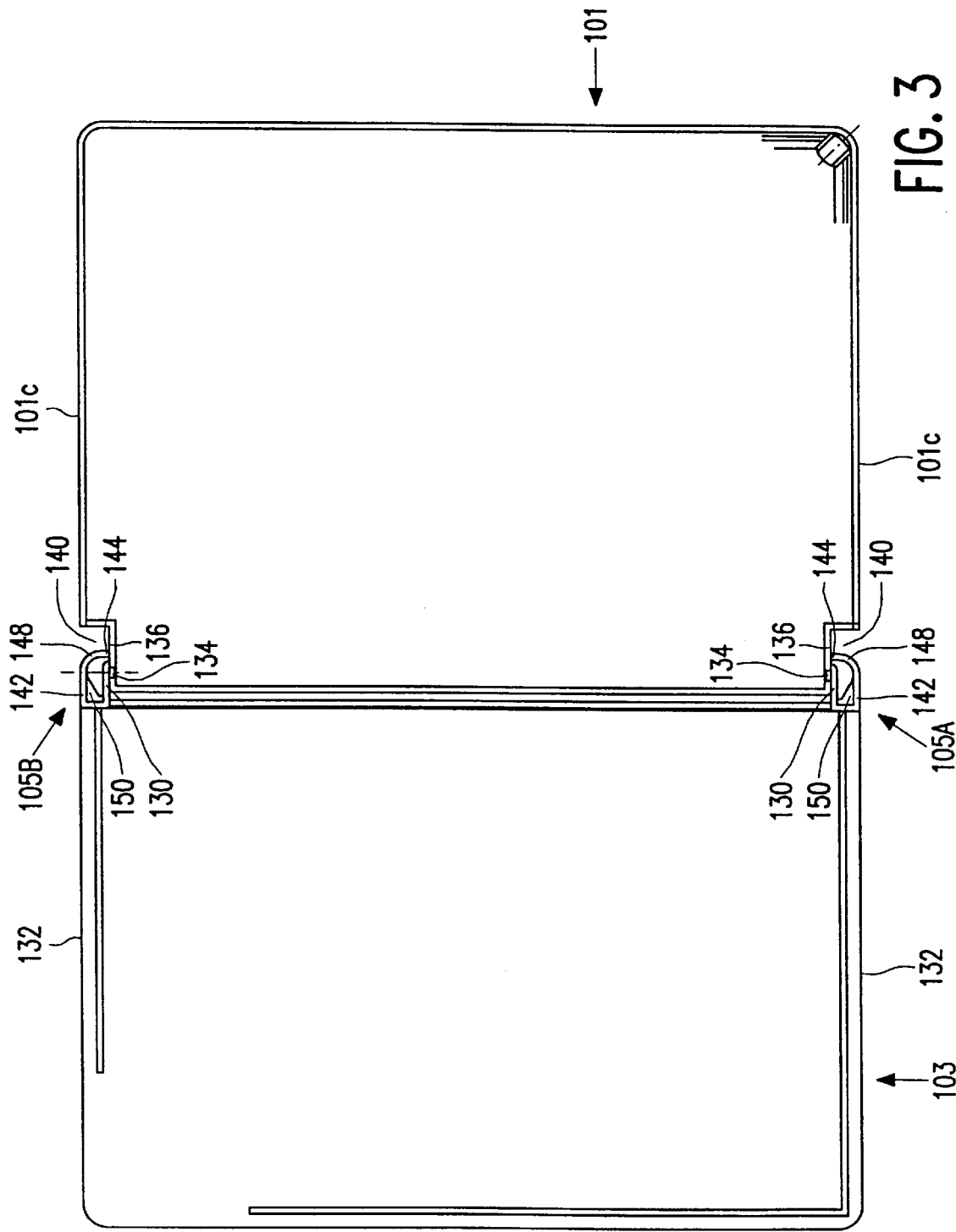

HOUSING WITH READABLE SIDE WALLS FOR A DISC-SHAPED INFORMATION CARRIER

CROSS-REFERENCE TO RELATED APPLICATIONS

This application is a continuation-in-part of application Ser. No. 09/030,493 filed Feb. 25, 1998, now U.S. Pat. No. 5,890,590, and application Ser. No. 09/078,821 filed May 14, 1998, now abandoned.

BACKGROUND OF THE INVENTION

The invention relates to a housing for holding a disc-shaped information carrier, and more particularly to such a housing which comprises a bottom section having a holding device for holding the information carrier, and a cover section which is hingeably connected to the bottom section at a back side of the housing. The bottom section has a bottom wall, a transparent front wall which faces the back side of the housing, two side walls, and an insert sheet arranged on the bottom wall. The insert sheet has an upright portion which extends adjacent the front wall, and contains printed information which is readable through the front wall.

Such a housing is known from DE-A 34 25 579 and is used for the storage of an optical information disc, particularly a Compact Disc. The known housing comprises a bottom section having a central clamping device for clamping the optical disc. The bottom section has raised side walls, of which one side wall forms an uninterrupted front wall and of which two opposite side walls have recesses for the removal of the information disc from housing. The bottom section generally contains an insert sheet which has a folded upright front portion which faces the transparent raised front wall. The front portion can accommodate readable data about the information stored digitally in the information disc. The central clamping device is retained in the bottom section by snap pins in the side walls at intermediate locations between the front and rear side walls, and the central portion of the side walls between the snap pins is interrupted by a space into which the disc extends. This space permits easy gripping of the edge of the disc so that a user can remove it.

A drawback of the known housing is that it has only limited possibilities to accommodate externally readable information.

BRIEF SUMMARY OF THE INVENTION

It is an object of the invention to modify the housing of the type defined in the opening paragraph in such a manner that the possibilities of accommodating externally readable information in the housing are extended considerably.

To this end, the housing in accordance with the invention is characterized in that the side walls are transparent and the insert sheet has upright portions which extend adjacent the side walls.

In a preferred embodiment of the housing in accordance with the invention the side upright portions of the insert sheet extend adjacent the side walls along substantially the length of the side walls, and at least a part of each of the upright portions of the insert sheet extending adjacent these walls has been provided with printed information.

As a result the housing in accordance with the invention can accommodate readable information about the information disc on at least three edge faces of the housing, which are formed by the front wall and the two adjoining side walls of the bottom section. This provides great freedom in the design of storage devices, such as storage racks, for housings of information discs because in such devices the housing in accordance with the invention can occupy various positions in which the relevant information is readable for a user. A further advantage is that when the housing lies flat on a table or shelf the information at the front and side faces is perceptible from different directions or at different angles, so that a user is informed at a glance about the content of the housing. Furthermore, the housing in accordance with the invention provides additional creative opportunity for artwork designers.

A further preferred embodiment of the housing in accordance with the invention is characterized in that the bottom section comprises a transparent rear wall facing the front wall, the insert sheet has upright portions which extend adjacent the rear wall, and at least a part of each of the upright portions of the insert sheet extending adjacent the walls has been provided with printed information. In this embodiment optimum use is made of the possibility of displaying information at the edge faces of the housing.

Preferably, all the upright portions of the insert sheet have been provided with printed information.

In a still further preferred embodiment of the housing in accordance with the invention, the front wall and the side walls of the bottom section are each formed by an at least substantially uninterrupted wall and have at least substantially the same height with respect to the bottom wall. Preferably, the construction of the cover section is such that the rear wall is also substantially uninterrupted and has a height corresponding to the height of the front wall and the side walls.

BRIEF DESCRIPTION OF THE SEVERAL VIEWS OF THE DRAWING

FIG. 3 is a plan view of a second embodiment of the housing according to the invention, comprising a bottom part and a lid part in an opened state.

DETAILED DESCRIPTION OF THE INVENTION

Figure 1:
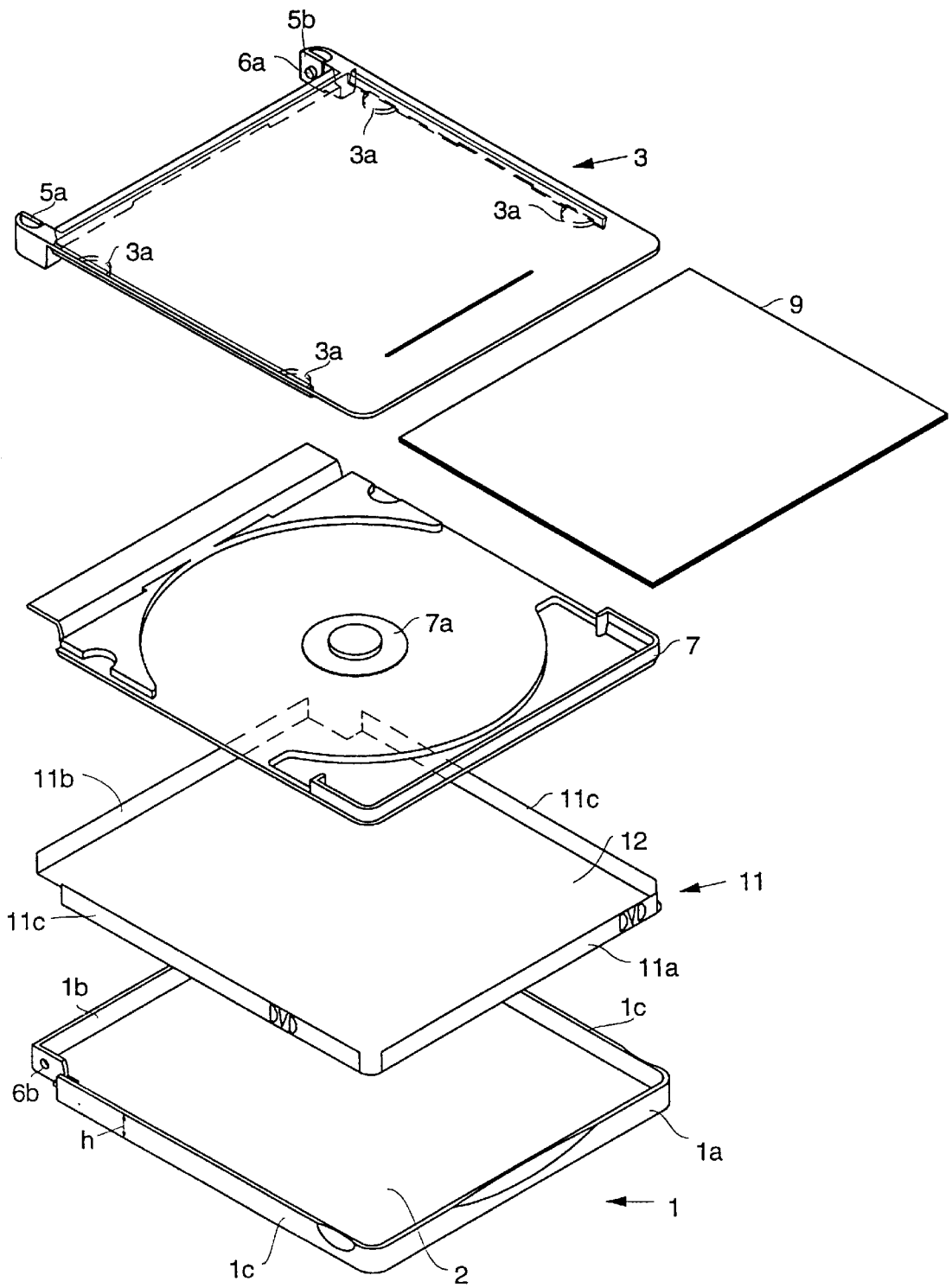
FIG. 1 is an exploded view of an embodiment of the housing in accordance with the invention.
Figure 2:
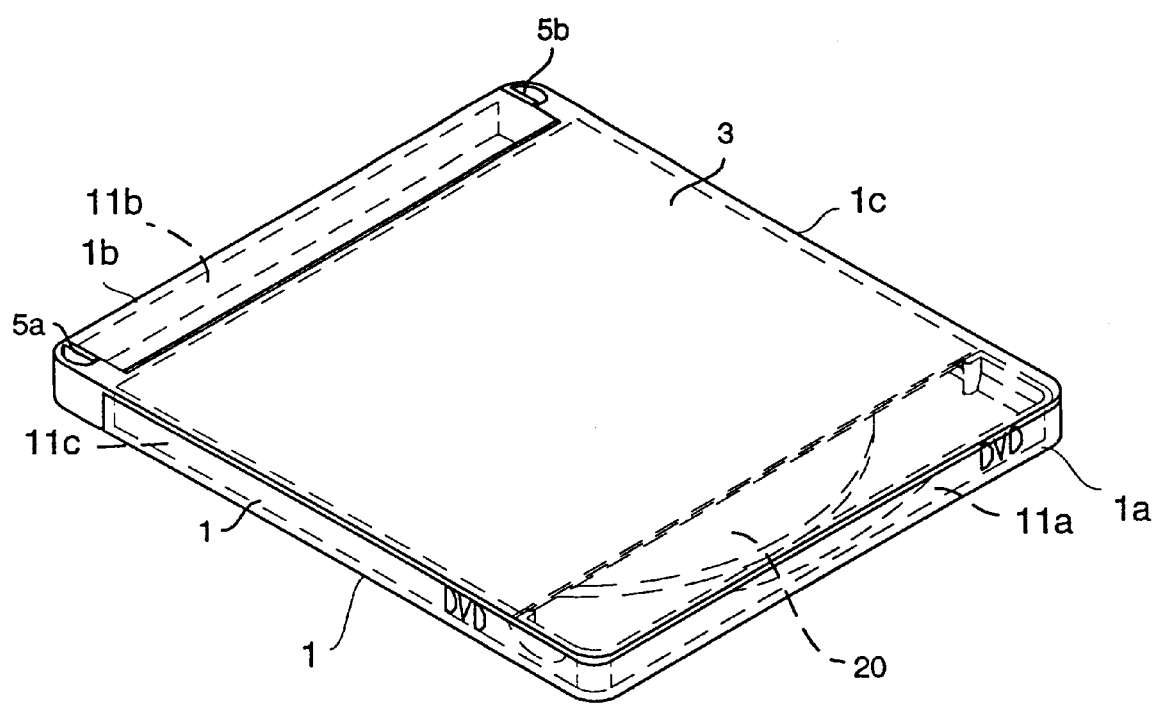
FIG. 2 is a perspective view showing the embodiment of FIG. 1 in a closed condition.

The housing in accordance with the invention shown in FIGS. 1 and 2 is suitable for the storage of an optical information carrier 20, in the present example a DVD. Such an information carrier has one or more optically inscribable and/or readable information layers and has a center hole. The housing, which has two parts, comprises a bottom section 1 and a cover section 3, which are hingeably connected to one another by corner hinges 5a and 5b. The bottom section 1 comprises a holding device 7, in the present example in the form of an insert tray, having a central clamping unit 7a for clamping the information carrier in position, the central clamping unit 7a engaging the center hole of the information carrier in the clamped condition.

The bottom section 1 is box-shaped and open at one side. It comprises a bottom wall 2, a front wall 1a and a rear wall 1b, which are upright with respect to the bottom wall 2, and two side walls 1c, which are upright with respect to the bottom wall 2. The front wall 2a, the rear wall 1b and the side walls 1c, all having the same height h, are transparent and essentially uninterrupted. Therefore, the front wall, the rear wall and the side walls have mutually the same height. In the present example the bottom wall 2 is also transparent. The rear wall 1b forms the back side of the housing, near which back side the hinges 5a and 5b are disposed. In the present example the hinges 5a and 5b comprise trunnions 6a, which form part of the cover section 3 and which engage openings 6b of the bottom section 1. The cover section 3 itself is substantially plate-shaped, is transparent, and in the present example comprises lugs 3a for retaining an inserted information booklet or folder 9. In this example, the housing has external dimensions corresponding to the generally known CD jewel box, the cover section 3 as well as the bottom section 5 in the present example having rounded corners.

The housing in accordance with the invention has been provided with an insert sheet 11, which is situated in the bottom section 1, i.e. on the bottom wall 2. In the present example the insert sheet 11 comprises four upright portions: a portion 11a which extends adjacent the front wall 1a, a portion 11b which extends adjacent the rear wall 1b, and two portions 11c which extend adjacent the side walls 1c. Those sides of the upright portions 11a, 11b and 11c which face the transparent walls 1a, 1b and 1c have been provided with printed information relating to the information carrier 20 associated with the housing. The upright portions 11a, 11b and 11c are preferably integral with a main portion 12 of the insert sheet 11 and have been folded with respect thereto about folding lines. The insert sheet 11 can be made of paper, a plastic or any other suitable material.

As is apparent from the drawings, the insert sheet 11 is wholly situated inside the bottom section 1, the main portion 12 in the present example extending between bottom wall 2 and the holding device 7.

Figure 5:
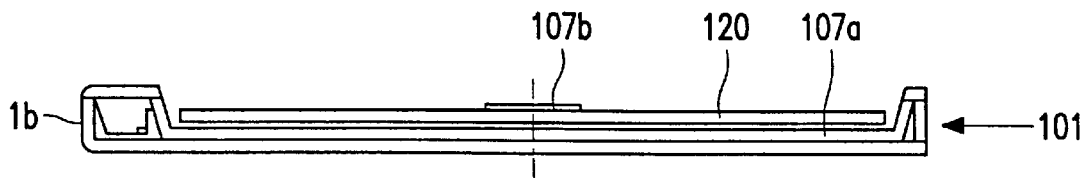
FIG. 5 shows the bottom part of the embodiment of FIG. 3 in a cross-section taken on the line V—V in FIG. 4.
Figure 4:
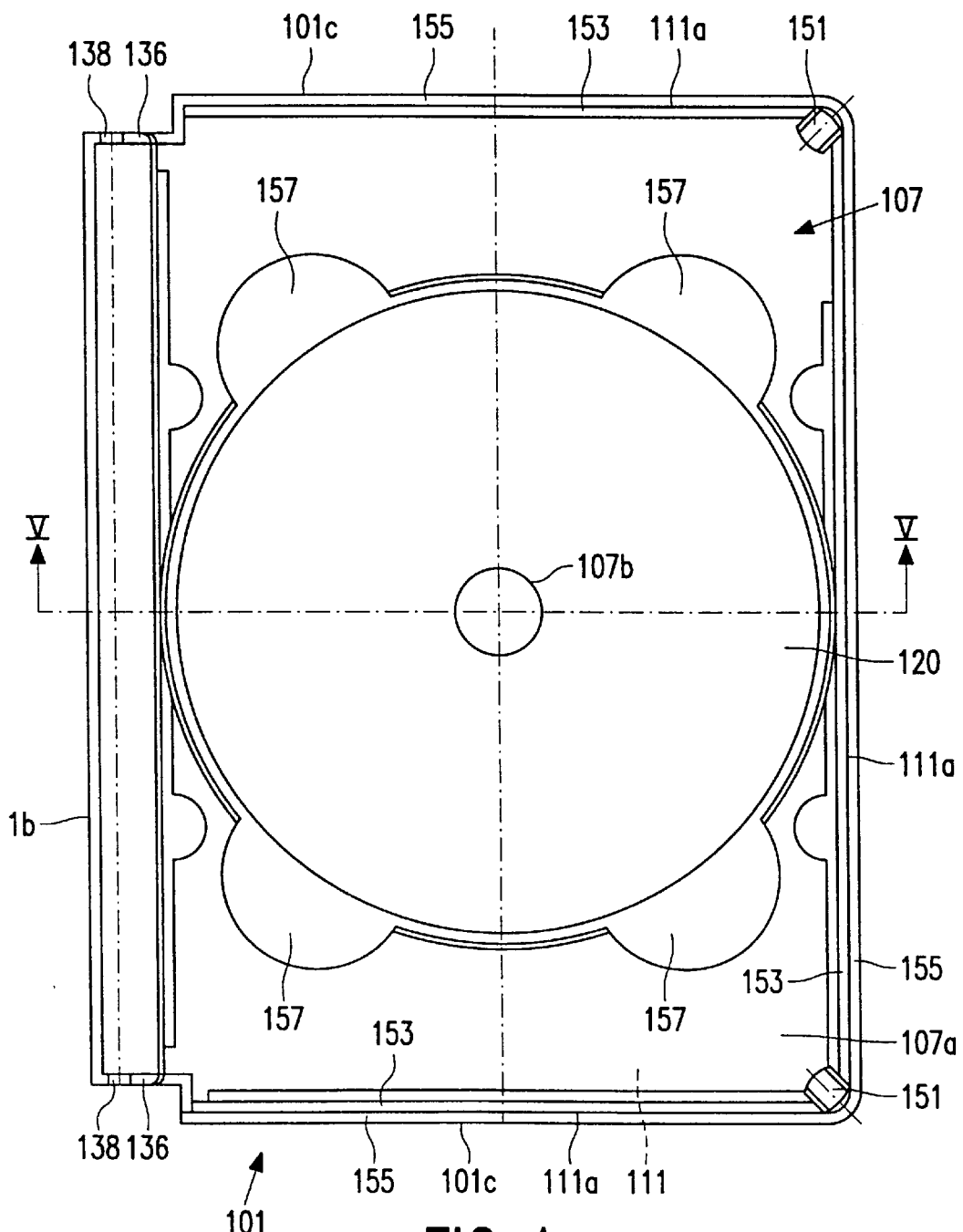
FIG. 4 is a plan view showing the bottom part of the embodiment of FIG. 3, provided with a retaining device.

FIGS. 3, 4 and 5 show another preferred embodiment, including elements for holding the retaining device in the bottom part. This housing is designed, for example, for the storage of a DVD provided with video information. The dimensions of the housing in this example are: a depth d of 142 mm, a width w of 190 mm, and a height h of 10 mm. The housing is provided with a bottom part 101 and a lid part 103. In the bottom part there is a retaining device 107 comprising a more or less plate-shaped element 107a which is provided with a clamping member 107b for retaining an information carrier 120 with clamping force. The lid part 103 is connected to the bottom part 101 by means of two corner hinges 105A and 105B and is provided with two recessed hinge arms 130 which each lie recessed with respect to a side 132 of the lid part 103. The bottom part 101 is provided with two corner recesses 140 adapted to the hinge arms 130 and bounded by recessed hinge walls 136 which each lie recessed with respect to a side 101c of the bottom part 101. The hinge arms 130 extend in the corner recesses 140 such that the hinge arms 130 and the hinge walls 136 constitute the corner hinges 105A and 105B. The hinge arms 130 are provided with studs 134 here which project into openings 138 of the hinge walls 136. The lid 103 is in addition provided with two protection walls 142, each of the protection walls 142 lying opposite a respective hinge wall 130.

The protection walls 142 are each provided with a free end portion 144, these free end portions 144 being bent towards one another and each extending opposite to and at a distance from one of the hinge arms 130. Each of the projection walls 142 is in addition provided with a fluent bend portion 148 which merges into the end portion 144 such that rounded transitions are formed between the lateral sides 101c and the rear side 101b of the bottom part 101 when the housing is closed, so that the housing will have rounded corners at the areas of the corner recesses 140. To avoid sharp corners also at the front of the housing, the bottom part 101 and the lid part 103 are rounded at the transitions between their fronts and their lateral sides. Sturdy ridges 150 are provided between the hinge arms 130 and the protection walls 142 for reinforcement. The element 107a present in the bottom part 103 is detachably fastened to the bottom part 103, for example by means of two snap closure elements 151. As shown in FIG. 4 these closure elements are located at the front corners of the bottom part. The element 107a is provided with upright walls 153 which extend at some distance from transparent walls 155 of the bottom part 103. An information leaflet 111 extends between the bottom part 103 and the element 107a, upright portions 111a of the leaflet 111 lying protected between the walls 153 and the transparent walls 155. The element 107a is provided with a number, in this example four, of openings or recesses 157 so that the information disc 120 can be easily taken from the housing. Because the snap closure elements are located adjacent corners of the bottom part it is possible to provide printed information along substantially the entire length of the side walls of the bottom part.

It is to be noted that the invention is not limited to the embodiment disclosed herein. For example, the hinges, the holding device, and other elements which are less relevant to the invention can be constructed in a different manner.

Moreover, the housing can be adapted specifically to different types of disc-shaped information carriers.

I claim:

1. A housing for holding a disc-shaped information carrier, which housing comprises a bottom section having a holding device for holding the information carrier, and a cover section which is hingeably connected to the bottom section at a back side of the housing, the bottom section comprising a bottom wall, a transparent front wall which faces the back side of the housing, two side walls, and an insert sheet arranged on the bottom wall, which insert sheet has an upright portion which extends adjacent the front wall, characterized in that the side walls are transparent and the insert sheet has upright portions which extend adjacent the side walls.

2. A housing as claimed in claim 1, characterized in that the bottom section further comprises a transparent rear wall facing the front wall, and the insert sheet comprises an upright portion which extends adjacent the rear wall.

3. A housing as claimed in claim 1, characterized in that all the upright portions of the insert sheet have been provided with printed information.

4. A housing as claimed in claim 1, characterized in that the front wall and the side walls of the bottom sections are each formed by an at least substantially uninterrupted wall and have at least substantially the same height with respect to the bottom wall.

5. A housing for holding a disc-shaped information carrier, which housing comprises a bottom section having a holding device for holding the information carrier, and a cover section which is hingeably connected to the bottom section at a back side of the housing, the bottom section comprising a bottom wall, a transparent front wall, which faces the back side of the housing, two side walls, and an insert sheet arranged on the bottom wall, which insert sheet has an upright portion which extends adjacent the front wall, characterized in that:

the side walls are transparent, the insert sheet has upright portions which extend adjacent the side walls along substantially the length of the side walls, and a part of each of the upright portions of the insert sheet extending adjacent the side walls has been provided with printed information.

6. A housing as claimed in claim 5, characterized in that the bottom section further comprises a transparent rear wall facing the front wall, and the insert sheet comprises an upright portion which extends adjacent the rear wall.

7. A housing as claimed in claim 5, characterized in that all the upright portions of the insert sheet have been provided with printed information.

8. A housing as claimed in claim 5, characterized in that the front wall and the side walls of the bottom sections are each formed by an at least substantially uninterrupted wall and have at least substantially the same height with respect to the bottom wall.

9. A housing as claimed in claim 8, characterized in that all the upright portions of the insert sheet extend along substantially the length of the respective adjacent wall.

10. A housing as claimed in claim 8, characterized in that:

the bottom section further comprises a transparent rear wall facing the front wall, the construction of the cover section is such that the rear wall is also substantially uninterrupted and has a height corresponding to the height of the front wall and the side walls, and the insert sheet comprises an upright portion which extends adjacent the rear wall.

11. A housing for holding a disc-shaped information carrier, which housing comprises a bottom section having a holding device for holding the information carrier, and a cover section which is hingeably connected to the bottom section at a back side of the housing, the bottom section comprising a bottom wall, a transparent front wall which faces the back side of the housing, X two side walls, and an insert sheet arranged on the bottom wall, which insert sheet has an upright portion which extends adjacent the front wall, characterized in that:

the side walls are substantially uninterrupted transparent walls, the holding device is retained in the bottom section by retaining means disposed solely adjacent corners of the bottom section, the insert sheet has upright portions which extend adjacent the side walls along substantially the length of the side walls, and at least a part of each of the upright portions of the insert sheet extending adjacent the side walls has been provided with printed information.

12. A housing as claimed in claim 11, characterized in that said retaining means detachably fastens the holding device to the bottom section.

13. A housing as claimed in claim 11, characterized in that said retaining means comprises a first snap closure element at a corner between the front wall and one of the side walls, and a second snap closure element at a corner between the front wall and the other of the side walls.

14. A housing as claimed in claim 12, characterized in that said retaining means detachably fastens the holding device to the bottom section.

15. A housing as claimed in claim 11, characterized in that the bottom section further comprises a transparent rear wall facing the front wall, the insert sheet comprises an upright portion which extends adjacent the rear wall, and all the upright portions of the insert sheet are provided with printed information.

16. A housing as claimed in claim 15, characterized in that the front wall is formed by an at least substantially uninterrupted wall, and the front wall and the side walls of the bottom sections have at least substantially the same height with respect to the bottom wall.

17. A housing as claimed in claim 16, characterized in that the construction of the cover section is such that the rear wall is also substantially uninterrupted and has a height corresponding to the height of the front wall and the side walls.

18. A housing as claimed in claim 17, characterized in that said retaining means comprises a first snap closure element at a corner between the front wall and one of the side walls, and a second snap closure element at a corner between the front wall and the other of the side walls.

* * * * *

UNITED STATES PATENT AND TRADEMARK OFFICE
CERTIFICATE OF CORRECTION

PATENT NO.    : 6,000,537
DATED         : December 14, 1999
INVENTOR(S)   : Peter J. Doodson It is certified that error appears in the above-identified patent and that said Letters Patent is hereby corrected as shown below:

Column 5,
Line 40, delete "X".

Signed and Sealed this

Twelfth Day of November, 2002

Attest:

Attesting Officer

JAMES E. ROGAN
Director of the United States Patent and Trademark Office